April 22, 1924.
C. A. CLARK
CAMP STOVE
Filed July 25, 1923
1,491,080
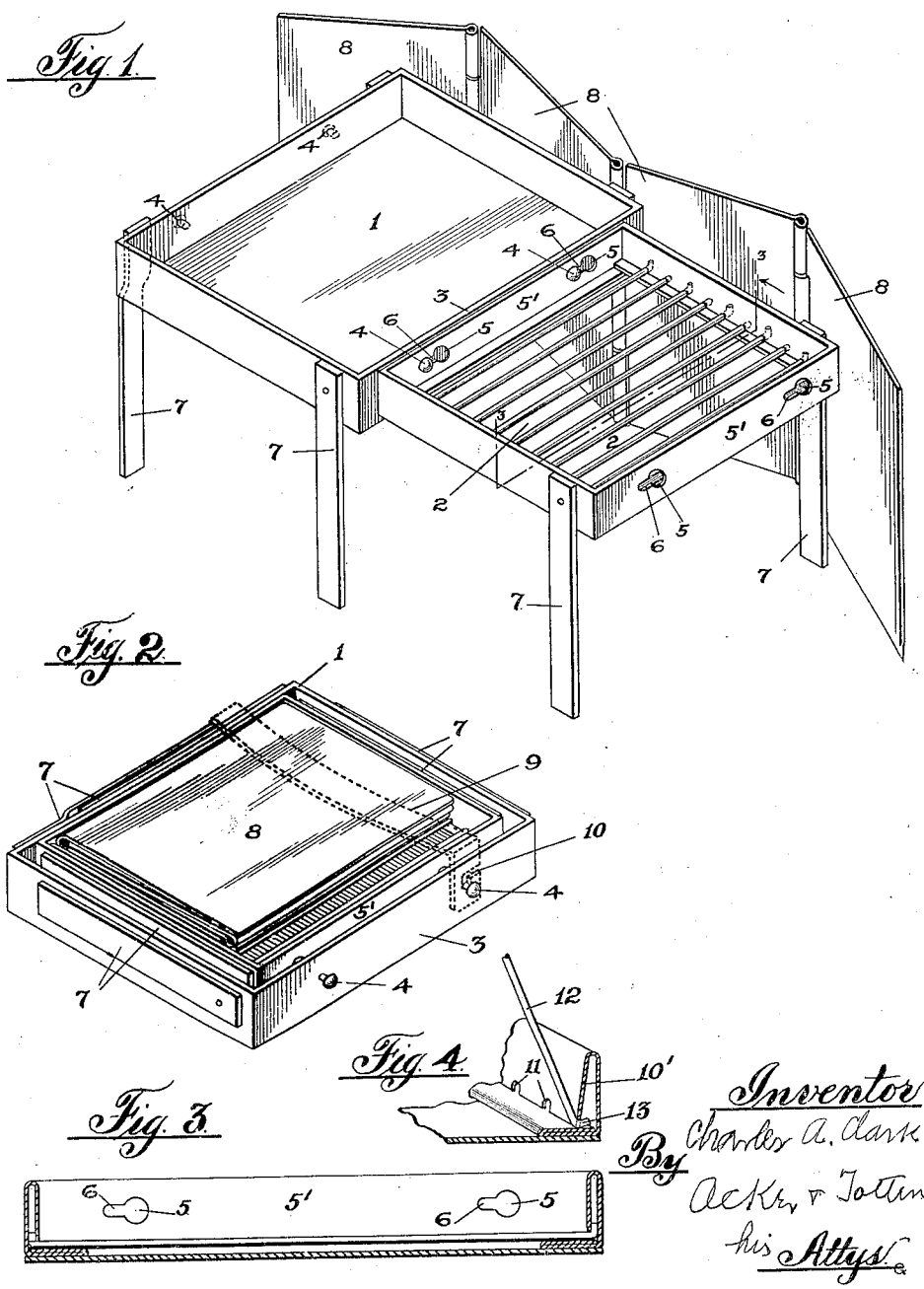

Patented Apr. 22, 1924.

1,491,080

UNITED STATES PATENT OFFICE.

CHARLES A. CLARK, OF TRACY, CALIFORNIA.

CAMP STOVE.

Application filed July 25, 1923. Serial No. 653,687.

*To all whom it may concern:*

Be it known that I, CHARLES A. CLARK, a citizen of the United States, residing at Tracy, in the county of San Joaquin and State of California, have invented certain new and useful Improvements in Camp Stoves, of which the following is a specification.

The hereinafter described invention relates to a camp stove more particularly designed for use of huntsmen and fishermen, although equally as well adapted for camp purposes generally, and the same comprises a demountable or foldable stove composed of a frying pan section and a gridiron section adapted to be detachably united one to the other when in extended or assembled relation, each section of the stove when arranged for use being supported or held in proper position by means of a plurality of leg members hingedly or foldably united thereto, the members of the stove being designed to be folded or placed in closed assembled position for the production of a compact body or package when not required for cooking purposes, there being associated with said members a wind shield or guard member composed of hingedly united sections; the object of the invention being the production of a simple, inexpensive, practical and efficient camp stove and one capable of being placed in folded or closed condition for the formation of a small and compact package for easy transportation, handling or shipment from place to place.

To comprehend the invention reference should be had to the accompanying sheet of drawings, wherein:—

Figure 1 is a perspective view of the stove with its members positioned for use.

Figure 2 is a view disclosing the members of the stove in closed position.

Figure 3 is a longitudinal sectional view through the gridiron taken on the line 3—3 Fig. 1 of the drawings and viewed in the direction of the arrow.

Figure 4 is a broken detail sectional view disclosing the manner of uniting the bars of the gridiron relative to the end walls thereof.

In the drawings, the numeral 1 is used to designate the frying pan section of the improved camp stove and 2 the gridiron section thereof and which is adapted to lie or fit within the frying pan section 1 when the members stand in closed relation. From one of the flanged side walls 3 of the frying pan section 1 project the spaced headed lugs 4, which are adapted to fit through spaced openings 5 of the side walls 5' of the gridiron member 2 when the same is applied to the frying pan section for lateral extension therefrom for use in cooking of articles. Each opening 5 is formed with a slotted longitudinal extension 6 into which the studs 4 fit on the gridiron section or member 2 being given slight longitudinal movement, after the headed end of the lugs have been inserted through the openings 5 in order to hold the said member in locked engagement with the frying pan member or section 1 of the stove, Fig. 1 of the drawings.

To the upstanding flanged walls of the sections 1 and 2 are pivotally secured the supporting legs 7, which when thrown downwardly or into vertical position serve as the supporting means for holding the assembled members of the stove in proper position and a given distance above the surface of the ground, giving ample room or clearance space for the building of a fire beneath the stove members, it being understood that the leg members are driven a suitable distance within the ground to hold the stove substantially rigid when the parts stand assembled for cooking purposes.

In order to protect the fire against the action of the wind, I have provided a wind shield or guard composed of a plurality of hingedly connected sections 8, which on the stove members standing in assembled relation is so positioned as to act as a wind break or shield, Fig. 1 of the drawings. Preferably the wind shield or guard is of such a length as to permit of the same enclosing one end and a portion of the sides of the stove and by so doing not only providing a perfect wind guard, but insuring proper draft for the fire. Inasmuch as the guard is composed of foldable sections, the same when in closed position is adapted to overlie the gridiron section when placed within the frying pan section and thus serves as a cover for the stove when the members thereof are placed in closed position, Fig. 2 of the drawings, and when thus assembled the parts are held securely together by means of spring metal locking bars 9, the ends of which are provided with bayonet slots 10 adapted to fit over and engage with the head end of the lugs 4. Thus provision is made for the holding of the parts securely in position when the members are disassembled and placed in packed formation.

While the gridiron may be of any suitable construction, preference is given for ease of manufacture to providing the end flange walls thereof with an extended downwardly flanged extension 10', which is provided with a series of spaced aligned notches or cut-outs 11 and each iron or bar 12 of the gridiron is formed with a hooked end 13, opposite ends of adjacent irons or bars being so hooked. These hooked ends are fitted within the cutouts of the respective flanged extensions 10' of the gridiron frame and then given a turn so as to engage with the inner surface thereof and the flanged extensions 10' are then pressed securely down to clamp the flanged or hooked ends of the spaced irons or bars 12 of the gridiron securely in position.

While I have described and illustrated the preferred manner of uniting and constructing the various members constituting the improved knock-down camping stove, it is obvious that any suitable form of means may be employed for detachably or foldably uniting the gridiron member to the frying pan member and equally so any suitable form of means may be utilized for holding the members when in disassembled or knock-down position securely secured one within the other for compactness in handling or transporting from place to place.

The foregoing described foldable camp stove is simple of construction, it is easily handled by campers, exceedingly compact when placed in knock-down condition and thus rendered easy as to handling for transportation purposes.

It will be understood that the assembled members of the camp stove may be made in varying sizes for the production of various sizes of camp stoves, and if so desired the said stove when in assembled or knock-down condition may be enclosed within a suitable casing—not herein illustrated.

It is not my intent, nor do I wish to be understood as limiting the invention to the details of construction herein shown and described, but on the contrary wish to be understood as claiming the same as broadly as the state of the patented art will warrant.

Having thus described the invention, what is claimed as new and desired to protect by Letters Patent is:—

1. A camp stove comprising a frying pan member and a gridiron member disconnected therefrom and adapted to fit within the frying pan member when in closed relation therewith, means carried by the side wall of the frying pan with which the gridiron is adapted to interlock for lateral extension therefrom in substantially the same horizontal plane when the parts are positioned for cooking purposes, supporting legs foldably united to the respective gridiron and frying pan members of the camp stove, and a wind shield member composed of a series of foldable sections, said member adapted to overlie the gridiron when the various members are placed in closed relation.

2. A camp stove comprising a frying pan member, a gridiron member adapted to fit within the frying pan member, means for detachably connecting the gridiron to the frying pan for lateral extension therefrom, supporting legs foldably united to said members of the camp stove, a foldable wind shield member for the stove adapted to form a cover when the members are placed in closed position, and detachable means for holding the wind shield locked to the frying pan member.

In testimony whereof I have signed my name to this specification.

CHARLES A. CLARK.